(12) United States Patent
Cases et al.

(10) Patent No.: US 7,868,651 B1
(45) Date of Patent: Jan. 11, 2011

(54) OFF-DIE TERMINATION OF MEMORY MODULE SIGNAL LINES

(75) Inventors: Moises Cases, Austin, TX (US); Bhyrav M. Mutnury, Austin, TX (US); Nam H. Pham, Round Rock, TX (US)

(73) Assignee: International Business Machines Corporation, Armonk, NY (US)

( * ) Notice: Subject to any disclaimer, the term of this patent is extended or adjusted under 35 U.S.C. 154(b) by 0 days.

(21) Appl. No.: 12/632,858

(22) Filed: Dec. 8, 2009

(51) Int. Cl.
H03K 17/16 (2006.01)
(52) U.S. Cl. .......................................... 326/30; 326/21
(58) Field of Classification Search ................... 326/21, 326/26, 27, 30
See application file for complete search history.

(56) References Cited

U.S. PATENT DOCUMENTS

| | | | |
|---|---|---|---|
| 5,483,573 A | 1/1996 | Steenton et al. | |
| 5,734,208 A | 3/1998 | Jones | |
| 6,089,903 A | 7/2000 | Stafford Gray et al. | |
| 6,215,686 B1 | 4/2001 | Deneroff et al. | |
| 6,390,840 B1 | 5/2002 | Wang | |
| 6,456,139 B1 | 9/2002 | Pelissier et al. | |
| 6,567,877 B1 | 5/2003 | Lewis et al. | |
| 6,634,889 B2 | 10/2003 | Miller et al. | |
| 6,882,082 B2 | 4/2005 | Greeff et al. | |
| 7,782,082 B2 * | 8/2010 | Oh et al. ......................... 326/30 |
| 2003/0126338 A1 * | 7/2003 | Dodd et al. ................... 710/305 |
| 2007/0008788 A1 * | 1/2007 | Ba .......................... 365/189.05 |
| 2007/0080767 A1 | 4/2007 | Kuzmenka | |
| 2008/0316220 A1 | 12/2008 | Chen et al. | |
| 2009/0300260 A1 * | 12/2009 | Woo et al. .................... 710/316 |
| 2009/0302892 A1 * | 12/2009 | Waldrop ........................ 326/93 |

* cited by examiner

*Primary Examiner*—Don P Le
(74) *Attorney, Agent, or Firm*—Edward J. Lenart; Tom Tyson; Biggers & Ohanian, LLP

(57) ABSTRACT

Off-die termination of memory module signal lines in a computer memory subsystem. The computer memory subsystem includes a memory controller and a DIMM socket installed on a PCB. The memory controller is electrically coupled to the DIMM socket via a memory module signal line. Off-die termination includes detecting, by a termination controller installed on the PCB, no presence of a DIMM in the DIMM socket and, responsive to the detection, activating, by the termination controller, an off-die termination component on the PCB to terminate the memory module signal line.

20 Claims, 4 Drawing Sheets

OFF-DIE TERMINATION OF MEMORY MODULE SIGNAL LINES

BACKGROUND OF THE INVENTION

1. Field of the Invention

The field of the invention is data processing, or, more specifically, methods, apparatus, and products for off-die termination of memory module signal lines in a computer memory subsystem.

2. Description of Related Art

The development of the EDVAC computer system of 1948 is often cited as the beginning of the computer era. Since that time, computer systems have evolved into extremely complicated devices. Today's computers are much more sophisticated than early systems such as the EDVAC. Computer systems typically include a combination of hardware and software components, application programs, operating systems, processors, buses, memory, input/output devices, and so on. As advances in semiconductor processing and computer architecture push the performance of the computer higher and higher, more sophisticated computer software has evolved to take advantage of the higher performance of the hardware, resulting in computer systems today that are much more powerful than just a few years ago.

Computer systems today have increasingly more powerful processors and increasingly greater memory use. Many computer systems have one or more DIMM sockets in which computer memory in the form of a DIMM is installed. In some computers, a DIMM may be installed but not used. In these cases, on-die termination ('ODT') within the memory modules of the DIMM itself is employed to terminate the signal lines of a memory bus in the DIMM socket. If not terminated, the signal lines form stub lines and cause signal reflection.

When a DIMM is not installed in a socket, however, the on-die terminators are removed and there are few options to terminate the signal lines. One way currently employed to terminate such signal lines when a DIMM is not installed in a socket is by using a dummy DIMM that employs ODT but cannot be accessed by a memory controller for typical memory operations—reads, writes, and so on. Dummy DIMMs, however, increase the operational cost of each computer and create a logistical issue, especially in large data centers housing a great number of servers, due to the fact that each dummy DIMM must be physically installed in a socket by a human user.

SUMMARY OF THE INVENTION

Methods, apparatus, and products for off-die termination of memory module signal lines in a computer memory subsystem are disclosed. In embodiments of the present invention, the computer memory subsystem includes a memory controller and a Dual In-line Memory Module ('DIMM') socket installed on a printed circuit board ('PCB'). The memory controller is electrically coupled to the DIMM socket via a memory module signal line. Off-die termination of memory module signal lines in accordance with embodiments of the present invention includes detecting, by a termination controller installed on the PCB, no presence of a DIMM in the DIMM socket and, responsive to the detection, activating, by the termination controller, an off-die termination component on the PCB to terminate the memory module signal line.

The foregoing and other objects, features and advantages of the invention will be apparent from the following more particular descriptions of exemplary embodiments of the invention as illustrated in the accompanying drawings wherein like reference numbers generally represent like parts of exemplary embodiments of the invention.

DETAILED DESCRIPTION OF EXEMPLARY EMBODIMENTS

Figure 1:
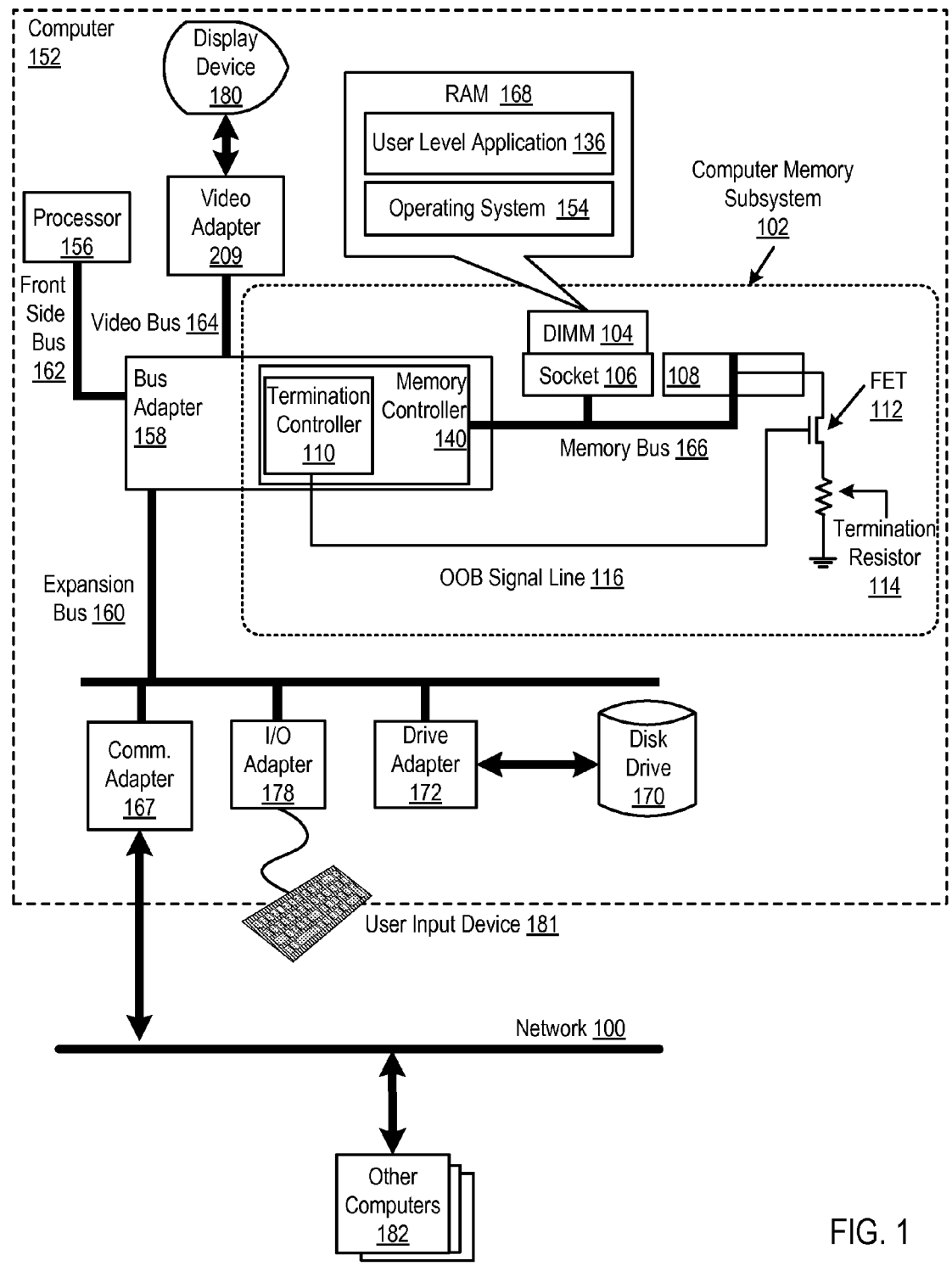
FIG. 1 sets forth a network diagram of a system in which a computer memory subsystem includes off-die termination of memory module signal lines according to embodiments of the present invention.

Exemplary methods, apparatus, and products for off-die termination of memory module signal lines in a computer memory subsystem in accordance with the present invention are described with reference to the accompanying drawings, beginning with FIG. 1. FIG. 1 sets forth a network diagram of a system in which a computer memory subsystem includes off-die termination of memory module signal lines according to embodiments of the present invention. The term off-die generally describes a location of a terminating a signal line. Off-die is used here in contrast to the common technique of "on-die" termination.

On-die termination (ODT) describes technology in which a termination resistor for impedance matching in transmission lines is located inside a semiconductor chip instead of on a printed circuit board. In lower frequency applications, interconnection lines may be modeled as lumped circuits. In this case there is no need to consider the concept of termination. Under the low frequency condition, every point in an interconnect wire can be assumed to have the same voltage as every other point for any instance in time and there is no need to consider the concept of termination.

If the propagation delay in a wire or interconnect is greater than approximately one sixth of the rise time of the digital signal, then the lumped circuit model is no longer valid and the interconnect has to be analyzed as a transmission line. In a transmission line the interconnect is modeled as a circuit with distributed inductance, capacitance, and resistance.

In order for a transmission line to have as clean signal as possible the distributed impedance of the every point of the transmission line should be uniform, ideally. If there is any point where the impedance of the transmission line is not uniform because of a disconnection, discontinuity, or different material, then a signal traveling along the transmission line may be affected from noise such as signal reflection, distortion, ringing, and so on.

When a signal path has an impedance discontinuity, an impedance mismatch, then a termination impedance may be placed at the point of line discontinuity. The termination impedance is referred to as termination. For example, resistors may be placed on computer motherboards to terminate high speed busses. In on-die termination technologies, the termination is located inside a semiconductor chips rather than having the necessary resistive termination located on the motherboard.

In contrast to on-die termination, methods of off-die termination as described here terminate a signal line not on a semiconductor die itself, but rather off the semiconductor die. In some embodiments, off-die termination may occur in a socket, on a motherboard, or some combination of the two.

The system of FIG. 1 includes automated computing machinery comprising an exemplary computer (152) having a computer memory subsystem (102) configured for off-die termination according to embodiments of the present invention. The computer memory subsystem (102) of FIG. 1 includes a memory controller (140) implemented as part of a bus adapter (158). The computer memory subsystem (102) also includes two DIMM sockets (106, 108) installed on a printed circuit board ('PCB') or a motherboard. Installed in one of the DIMM sockets (106) is a DIMM (104). The DIMM includes one or more Random Access Memory ('RAM') (168) modules. The sockets (106, 108) are coupled to a memory controller (140) by a number of a memory module signal lines depicted in the example of FIG. 1 as a high speed memory bus (166). A memory module signal line may be any signal line in a DIMM socket that couples a DIMM installed in the DIMM socket to a memory controller. Such signal lines may include data read or write signal lines, memory address signal lines, or other signal lines as will occur to readers of skill in the art. In some embodiments of the present invention the term "memory module signal line" refers to signal line stubs present in a DIMM socket. Such stubs, if not terminated, propagate signal reflection and other signal noise in the signal lines.

The computer memory subsystem (102) of FIG. 1 also a termination controller, a module of automated computing machinery—an aggregation of computer hardware and software—configured to control off-die termination of the memory module signal lines (166). The termination controller (110) in the example of FIG. 1 is implemented as a part of the memory controller (140). The termination controller (110) may control off-die termination of the memory module signal lines (166) in accordance with embodiments of the present invention by detecting no presence of a DIMM in the DIMM socket (108) and, responsive to the detection, activating an off-die termination component on the PCB to terminate the memory module signal lines (166). The termination controller (110) in the example of FIG. 1 may detect no presence of a DIMM in the DIMM socket (108) in various ways. One such way includes receiving a notification from the memory controller (140) during startup that no DIMM is installed in the DIMM socket. During a typical startup routine, a basic input/output service ('BIOS') module may instruct the memory controller (140) to discover the available computer memory. In response to the instruction from the BIOS module the memory controller (140) may discover the DIMM (104) in socket (106) and no DIMM in socket (108). The memory controller (140) may then be configured to notify the termination controller (110) that no DIMM is installed in socket (108). This is but one way, among many possible ways, that a termination controller may discover that no DIMM is installed in a DIMM socket. Readers of skill in the art will immediately recognize many other ways to detect no presence of a DIMM in a DIMM socket and each such way is well within the scope of the present invention.

In the example of FIG. 1, the off-die termination component is implemented as a Field Effect Transistor ('FET') (112). When enabled, the FET couples the memory module signal lines (166) to a ground reference voltage through a termination resistor (114). The termination controller may enable the FET (112) through the out-of-band signal line (116) coupling the termination controller (110) and the FET (112).

The RAM (168) of the example computer (152) of FIG. 1 is connected through a high speed memory bus (166) and bus adapter (158) to at least one processor (156), or 'CPU,' and to other components of the computer (152). Stored in RAM (168) is a user level application (136), a module of computer program instructions for carrying out user level data processing tasks. Examples of user level applications include word processor applications, spreadsheet applications, multimedia library applications, multimedia playback applications, database management applications, and so on as will occur to readers of skill in the art. Also stored in RAM (168) is an operating system (154). Operating systems useful in computers having a computer memory subsystem including off-die termination of memory module signal lines according to embodiments of the present invention include UNIX™, Linux™, Microsoft XP™, AIX™, IBM's i5/OS™, and others as will occur to those of skill in the art. The operating system (154) and user level application (136) in the example of FIG. 1 are shown in RAM (168), but many components of such software typically are stored in non-volatile memory also, such as, for example, on a disk drive (170).

The computer (152) of FIG. 1 includes disk drive adapter (172) coupled through expansion bus (160) and bus adapter (158) to processor (156) and other components of the computer (152). Disk drive adapter (172) connects non-volatile data storage to the computer (152) in the form of disk drive (170). Disk drive adapters useful in computers that include a computer memory subsystem having off-die termination of memory module signal lines according to embodiments of the present invention include Integrated Drive Electronics ('IDE') adapters, Small Computer System Interface ('SCSI') adapters, and others as will occur to those of skill in the art. Non-volatile computer memory also may be implemented for as an optical disk drive, electrically erasable programmable read-only memory (so-called 'EEPROM' or 'Flash' memory), RAM drives, and so on, as will occur to those of skill in the art.

The example computer (152) of FIG. 1 includes one or more input/output ('I/O') adapters (178). I/O adapters implement user-oriented input/output through, for example, software drivers and computer hardware for controlling output to display devices such as computer display screens, as well as user input from user input devices (181) such as keyboards and mice. The example computer (152) of FIG. 1 includes a video adapter (209), which is an example of an I/O adapter specially designed for graphic output to a display device (180) such as a display screen or computer monitor. Video adapter (209) is connected to processor (156) through a high speed video bus (164), bus adapter (158), and the front side bus (162), which is also a high speed bus.

The exemplary computer (152) of FIG. 1 includes a communications adapter (167) for data communications with other computers (182) and for data communications with a data communications network (100). Such data communications may be carried out serially through RS-232 connections, through external buses such as a Universal Serial Bus ('USB'), through data communications networks such as IP data communications networks, and in other ways as will occur to those of skill in the art. Communications adapters implement the hardware level of data communications through which one computer sends data communications to another computer, directly or through a data communications network. Examples of communications adapters useful in computers that include a computer memory subsystem having off-die termination of memory module signal lines according to embodiments of the present invention include modems for wired dial-up communications, Ethernet (IEEE 802.3) adapters for wired data communications network communications, and 802.11 adapters for wireless data communications network communications.

The arrangement of computers and other devices making up the exemplary system illustrated in FIG. 1 are for explanation, not for limitation. Data processing systems useful according to various embodiments of the present invention may include additional servers, routers, other devices, and peer-to-peer architectures, not shown in FIG. 1, as will occur to those of skill in the art. Networks in such data processing systems may support many data communications protocols, including for example TCP (Transmission Control Protocol), IP (Internet Protocol), HTTP (HyperText Transfer Protocol), WAP (Wireless Access Protocol), HDTP (Handheld Device Transport Protocol), and others as will occur to those of skill in the art. Various embodiments of the present invention may be implemented on a variety of hardware platforms in addition to those illustrated in FIG. 1.

Figure 2A:
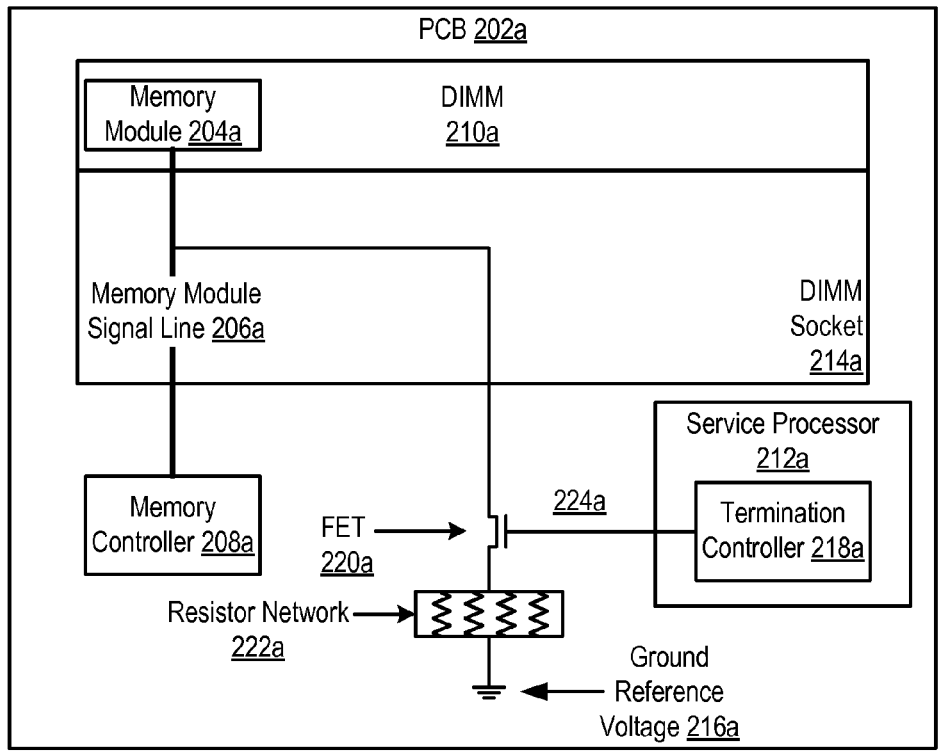
FIG. 2A sets forth a block diagram of an exemplary system for off-die termination of memory module signal lines in a computer memory subsystem according to embodiments of the present invention.

For further explanation, FIG. 2A sets forth a block diagram of an exemplary system for off-die termination of memory module signal lines in a computer memory subsystem according to embodiments of the present invention. The computer memory subsystem of FIG. 2A includes a memory controller (208a) and a DIMM socket (214a) installed on a PCB (202a). The memory controller (208a) is electrically coupled to the DIMM socket (214a) via a memory module signal line (206a). In the example of FIG. 2A, a DIMM (210a) is installed in the DIMM socket, and the memory module signal line (206a) couples a memory module (204a) of the DIMM (210a) to the memory controller (208a).

The system of FIG. 2A also includes a termination controller (218). The termination controller (218a) in the example of FIG. 2 is implemented as a module of a service processor (212a). A service processor is a microcontroller typically embedded on a motherboard of a server or computer that enables remote monitoring and management of computer components. The service processor is separate from the computer's main CPU, operating system, applications executed by the CPU, and the computer's primary network connections. An example of a service processor which may be implemented with a termination controller configured for off-die termination of memory module signal lines according to embodiments of the present invention is a baseboard management controller ('BMC'). A BMC is a specialized microcontroller embedded on the motherboard of a computer, generally a server. The BMC is the intelligence in the Intelligent Platform Management Interface (IPMI) architecture. The BMC manages the interface between system management software and platform hardware.

Different types of sensors built into a computer system report to the BMC on parameters such as temperature, cooling fan speeds, power mode, operating system status, etc. The BMC monitors the sensors and can send alerts to a system administrator via the network if any of the parameters do not stay within preset limits, indicating a potential failure of the system. The administrator can also remotely communicate with the BMC to take some corrective action such as resetting or power cycling the system to get a hung OS running again. These abilities save on the total cost of ownership of a system.

Physical interfaces to the BMC include System Management Bus ('SMBus'), an RS-232 serial console, address and data lines and an Intelligent Platform Management Bus (IPMB) that enables the BMC to accept IPMI request messages from other management controllers in the system.

In the example of FIG. 2A, the service processor (212a) and the termination controller (218a) of the service processor (212a) are coupled to a FET (220a) through an out-of-band signal line (224a) similar to the out-of-band signal line in FIG. 1.

The termination controller (218a) of FIG. 2A is configured for off-die termination of the memory module signal line (206a) by detecting no presence of a DIMM in the DIMM socket and, responsive to the detection, activating, by the termination controller, an off-die termination component on the PCB to terminate the memory module signal line. The termination controller (218a) of the service processor (212a) of FIG. 2A may detect no presence of a DIMM in the DIMM socket (214a) in various ways including by pinging the socket (214a) with a memory write command or a memory read command and receiving no response.

In the example of FIG. 2A, the off-die termination component is implemented as a FET (220a) and the termination controller (218a) activates the off-die termination component by enabling the FET (220a). The FET in the example of FIG. 2A, when enabled, is configured to couple the memory module signal line (206a) to a ground reference voltage (216a) through a termination resistor component, implemented here as a programmable resistor network (222a). A programmable resistor network (222a) enables a system management application, basic input/output services (BIOS) module, firmware, an operating system or other module of automated computing machinery to select and set a particular resistance to be used to terminate the memory module signal line (206a).

FIG. 2A depicts a system for off-die termination of memory module signals according to embodiments of the present invention when a DIMM (210a) is installed in a DIMM socket (214a). In such a configuration, the FET (220a) is not enabled by the termination controller (218a) and, as such, the memory module signal line (206a) is not terminated. For further explanation, therefore, FIG. 2B sets forth a block diagram of a further exemplary system for off-die termination of memory module signal lines in a computer memory subsystem according to embodiments of the present invention in which no DIMM is installed. The example system of FIG. 2B is similar to the system of FIG. 2A, where similar components are identified by similar reference numerals—FIG. 2A including reference numerals ending in 'a' and FIG. 2B including reference numerals ending in 'b.'

Figure 2B:
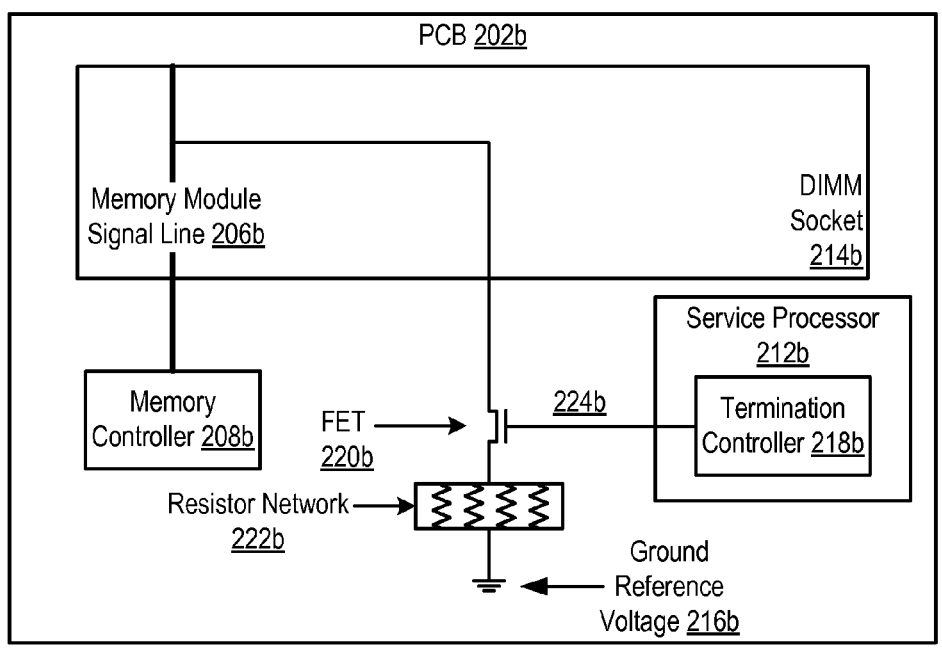
FIG. 2B sets forth a block diagram of a further exemplary system for off-die termination of memory module signal lines in a computer memory subsystem according to embodiments of the present invention.

The system of FIG. 2B, like the system of FIG. 2A, includes a computer memory subsystem that in turn includes a memory controller (208b) and a DIMM socket (214b) installed on a PCB (202b). The memory controller (208b) is electrically coupled to the DIMM socket (214b) via a memory module signal line (206b).

The system of FIG. 2B also includes a termination controller (218b) implemented as a module of a service processor (212b). The termination controller (218b) carries out off-die termination of the memory module signal line (206b) like the termination controller (218a) of FIG. 2A, by detecting no presence of a DIMM in the DIMM socket (214b) and, responsive to the detection, activating, by the termination controller, an off-die termination component on the PCB to terminate the memory module signal line (206b). In the example of FIG. 2B, the off-die termination component is a FET (220b). A FET is used here for clarity of explanation, not for limitation. Readers of skill in the art will immediately recognize that any electrical component capable of coupling an electrical signal line to a termination resistor component at the control of a termination controller may be implemented to operate as a off-die termination component. In the example of FIG. 2B, the FET (220b), when enabled, couples the memory module signal line (206b) to the ground reference voltage (216b) through a programmable resistor network (222b). The termination controller (218b) in the example of FIG. 2B enables the FET (220b) via the out-of-band signal line (224b).

The example system of FIG. 2B differs from the example system of FIG. 2A, however, in that, in the example of FIG. 2B no DIMM is installed in the DIMM socket (214b). As such, the termination controller (218b), upon detection of no DIMM presence in the DIMM socket (214b), has enabled the FET (220b) through the out-of-band signal line (224b) and coupled the memory module signal line (206b) to the ground reference voltage (216b) through the programmable resistor network (222b).

FIGS. 2A and 2B depict a system for off-die termination of memory module signal lines according to embodiments of the present invention in which the termination controller (218a, 218b) is implemented as part of a service processor (212a, 212b). For further explanation, therefore, FIG. 3A sets forth a block diagram of a further exemplary system for off-die termination of memory module signal lines in a computer memory subsystem according to embodiments of the present invention in which the termination controller (318a) is implemented as memory controller (308a) module.

Figure 3A:
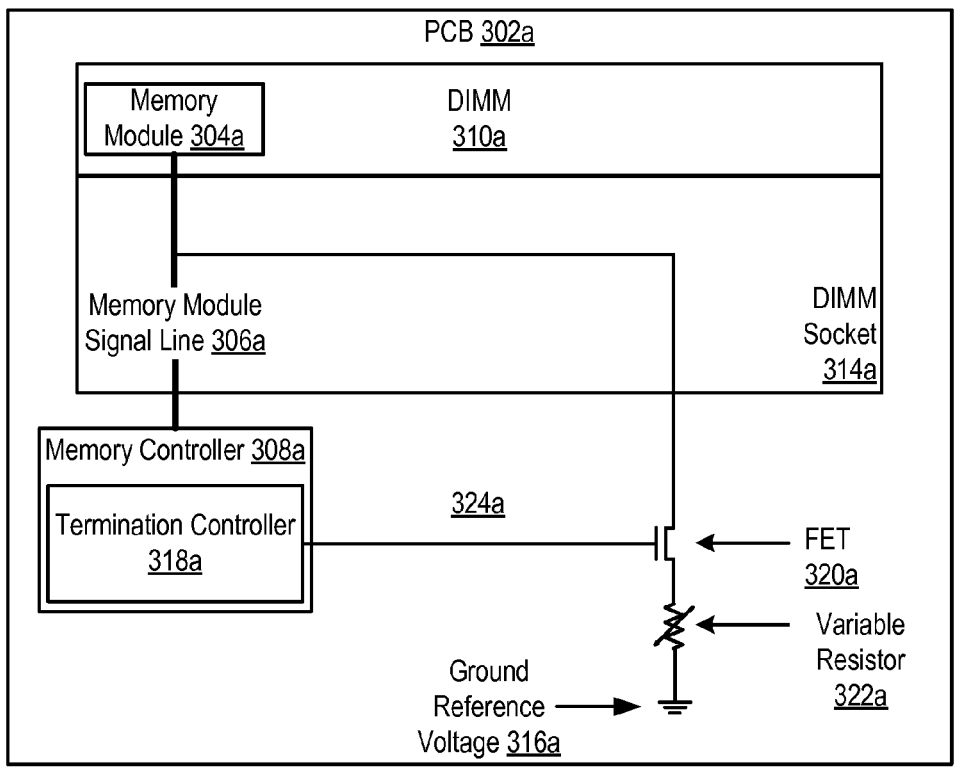
FIG. 3A sets forth a block diagram of a further exemplary system for off-die termination of memory module signal lines in a computer memory subsystem according to embodiments of the present invention.

The computer memory subsystem of FIG. 3A includes a memory controller (308a) and a DIMM socket (314a) installed on a PCB (302a). The memory controller (308a) is electrically coupled to the DIMM socket (314a) via a memory module signal line (306a). In the example of FIG. 3A, a DIMM (310a) is installed in the DIMM socket, and the memory module signal line (306a) couples a memory module (304a) of the DIMM (310a) to the memory controller (308a).

The system of FIG. 3A also includes a termination controller (318). The termination controller (318a) in the example of FIG. 2 is implemented as a module of the memory controller (308a). In the example of FIG. 3A, the termination controller (318a) is coupled to a FET (320a) through an out-of-band signal line (324a).

The termination controller (318a) of FIG. 3A is configured for off-die termination of the memory module signal line (306a) by detecting no presence of a DIMM in the DIMM socket and, responsive to the detection, activating, by the termination controller, an off-die termination component on the PCB to terminate the memory module signal line. In the example of FIG. 3A, the off-die termination component is implemented as a FET (320a) and the termination controller (318a) activates the off-die termination component by enabling the FET (320a). The FET in the example of FIG. 3A, when enabled, is configured to couple the memory module signal line (306a) to a ground reference voltage (316a) through a termination resistor component, implemented here as a variable resistor (322a). A variable resistor (322a) like the programmable resistor network (222a, 222b) of FIGS. 2A and 2B enables a system management application, basic input/output services (BIOS) module, firmware, an operating system or other module of automated computing machinery to select and set a particular resistance to be used to terminate the memory module signal line (306a).

FIG. 3A depicts a system for off-die termination of memory module signals according to embodiments of the present invention when a DIMM (310a) is installed in a DIMM socket (314a). In such a configuration, the FET (320a) is not enabled by the termination controller (318a) and, as such, the memory module signal line (306a) is not terminated. For further explanation, therefore, FIG. 3B sets forth a block diagram of a further exemplary system for off-die termination of memory module signal lines in a computer memory subsystem according to embodiments of the present invention in which no DIMM is installed. The example system of FIG. 3B is similar to the system of FIG. 3A, where similar components are identified by similar reference numerals—FIG. 3A including reference numerals ending in 'a' and FIG. 3B including reference numerals ending in 'b.'

Figure 3B:
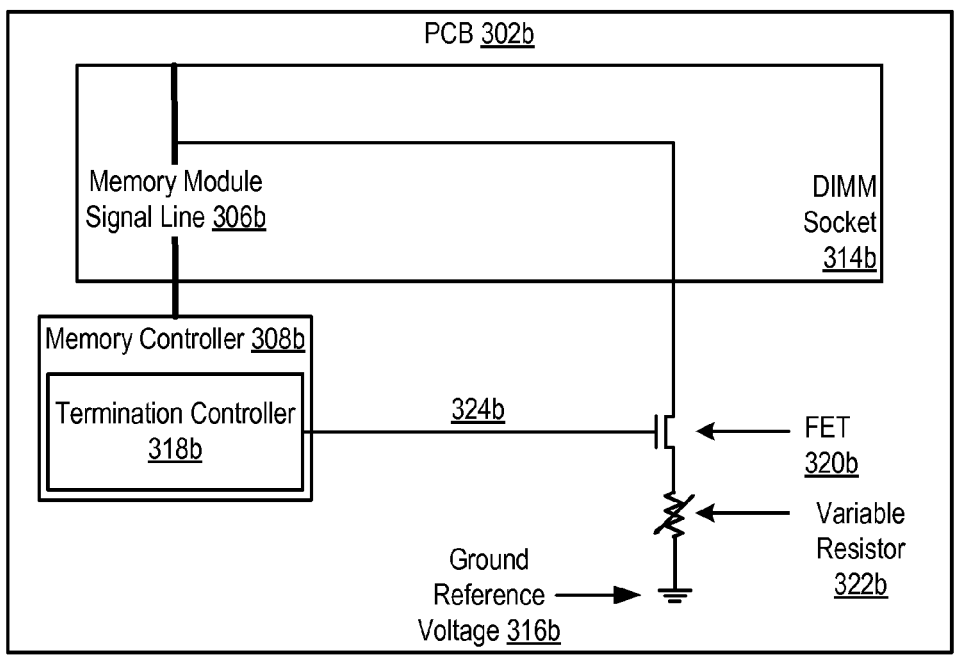
FIG. 3B sets forth a block diagram of a further exemplary system for off-die termination of memory module signal lines in a computer memory subsystem according to embodiments of the present invention.

The system of FIG. 3B, like the system of FIG. 3A, includes a computer memory subsystem that in turn includes a memory controller (308b) and a DIMM socket (314b) installed on a PCB (302b). The memory controller (308b) is electrically coupled to the DIMM socket (314b) via a memory module signal line (306b).

The system of FIG. 3B also includes a termination controller (318b) implemented as a module of the memory controller (308b). The termination controller (318b) carries out off-die termination of the memory module signal line (306b) like the termination controller (318a) of FIG. 3A, by detecting no presence of a DIMM in the DIMM socket (314b) and, responsive to the detection, activating, by the termination controller, an off-die termination component on the PCB to terminate the memory module signal line (306b). In the example of FIG. 3B, the off-die termination component is a FET (320b). In the example of FIG. 3B, the FET (320b), when enabled, couples the memory module signal line (306b) to the ground reference voltage (316b) through a variable resistor (322b). The termination controller (318b) in the example of FIG. 3B enables the FET (320b) via the out-of-band signal line (324b).

The example system of FIG. 3B differs from the example system of FIG. 3A, however, in that, in the example of FIG. 3B no DIMM is installed in the DIMM socket (314b). As such, the termination controller (318b), upon detection of no DIMM presence in the DIMM socket (314b), has enabled the FET (320b) through the out-of-band signal line (324b) and coupled the memory module signal line (306b) to the ground reference voltage (316b) through the variable resistor (322b).

Figure 4:
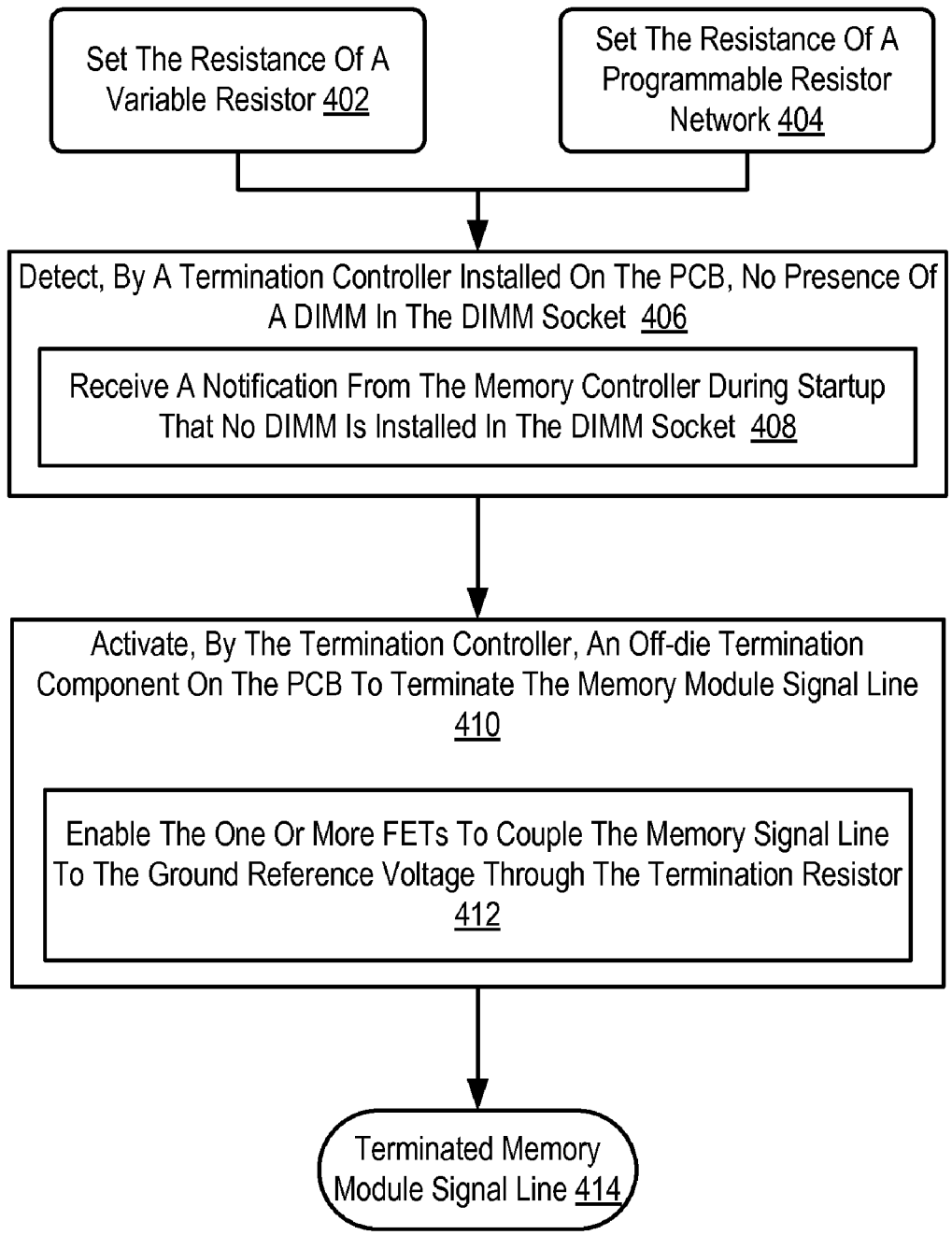
FIG. 4 sets forth a flow chart illustrating an exemplary method of off-die termination of memory module signal lines in a computer memory subsystem according to embodiments of the present invention.

For further explanation, FIG. 4 sets forth a flow chart illustrating an exemplary method of off-die termination of memory module signal lines in a computer memory subsystem according to embodiments of the present invention. In the method of FIG. 4, the computer memory subsystem includes a memory controller and a DIMM socket installed on a PCB. The memory controller is electrically coupled to the DIMM socket via a memory module signal line.

As mentioned above, in some embodiments of the present invention a termination resistor component through which a memory module signal line may be terminated in an off-die fashion may be implemented in a variety of ways including, for example, as a variable resistor or a programmable resistor network. When the termination resistor component is implemented as a variable resistor, the method of FIG. 4 includes setting (402) the resistance of the variable resistor. When the termination resistor component is implemented as a programmable resistor network, the method of FIG. 4 includes setting (404) the resistance of the programmable resistor network. The resistance of either type of termination resistor component may be set by a basic input/output service ('BIOS') module upon startup, by a service processor, or by the termination controller, to fine-tune termination of a memory module signal line in dependence upon various operating parameters, such as current, voltage, frequency of signals transmitted along the memory module signal lines, number of upstream or downstream DIMM sockets, number of DIMMs installed in other DIMM sockets, and so on as will occur to readers of skill in the art.

The method of FIG. 4 also includes detecting (406), by a termination controller installed on the PCB, no presence of a DIMM in the DIMM socket. In the method of FIG. 4, detecting (406) no presence of a DIMM in the DIMM socket is carried out by receiving (408) a notification from the memory controller during startup that no DIMM is installed in the DIMM socket. The termination controller may detect no presence of a DIMM in the DIMM socket in other ways such as, for example, by pinging the socket with a presence detect signal, a dummy read or write signal, or the like, and receiving no response.

Responsive to the detection (406), the method of FIG. 4 includes activating (410), by the termination controller, an off-die termination component on the PCB to terminate the memory module signal line. In the method of FIG. 4, the off-die termination component may be implemented with one or more FETs configured to couple the memory module signal to a ground reference voltage through a termination resistor component. Activating (410) the off-die termination component in the method of FIG. 4, is carried out by enabling (412) the one or more FETs to couple the memory module signal line to the ground reference voltage through the termination resistor component.

Upon enabling (412) the one or more FETs to couple the memory module signal line to the ground reference voltage through the termination resistor component in the method of FIG. 4, the memory module signal line is terminated (414). Such termination may reduce signal reflection and other types of signal nose which would otherwise be generated by a non-terminated memory module signal line.

In view of the explanations set forth above, readers will recognize that the benefits of off-die termination of memory module signal lines in a computer subsystem according to embodiments of the present invention include:

Reducing signal reflection in DIMM sockets having no DIMM installed;

Improving off-die termination without modification of common DIMMs or DIMM sockets; and Enabling termination of stub lines in a DIMM socket without use of a dummy DIMM.

As will be appreciated by one skilled in the art, aspects of the present invention may be embodied as a system, method or computer program product. Accordingly, aspects of the present invention may take the form of an entirely hardware embodiment, an entirely software embodiment (including firmware, resident software, micro-code, etc.) or an embodiment combining software and hardware aspects that may all generally be referred to herein as a "circuit," "module" or "system." Furthermore, aspects of the present invention may take the form of a computer program product embodied in one or more computer readable medium(s) having computer readable program code embodied thereon.

Any combination of one or more computer readable medium(s) may be utilized. The computer readable medium may be a computer readable signal medium or a computer readable storage medium. A computer readable storage medium may be, for example, but not limited to, an electronic, magnetic, optical, electromagnetic, infrared, or semiconductor system, apparatus, or device, or any suitable combination of the foregoing. More specific examples (a non-exhaustive list) of the computer readable storage medium would include the following: an electrical connection having one or more wires, a portable computer diskette, a hard disk, a random access memory (RAM), a read-only memory (ROM), an erasable programmable read-only memory (EPROM or Flash memory), an optical fiber, a portable compact disc read-only memory (CD-ROM), an optical storage device, a magnetic storage device, or any suitable combination of the foregoing. In the context of this document, a computer readable storage medium may be any tangible medium that can contain, or store a program for use by or in connection with an instruction execution system, apparatus, or device.

A computer readable signal medium may include a propagated data signal with computer readable program code embodied therein, for example, in baseband or as part of a carrier wave. Such a propagated signal may take any of a variety of forms, including, but not limited to, electro-magnetic, optical, or any suitable combination thereof. A computer readable signal medium may be any computer readable medium that is not a computer readable storage medium and that can communicate, propagate, or transport a program for use by or in connection with an instruction execution system, apparatus, or device.

Program code embodied on a computer readable medium may be transmitted using any appropriate medium, including but not limited to wireless, wireline, optical fiber cable, RF, etc., or any suitable combination of the foregoing.

Computer program code for carrying out operations for aspects of the present invention may be written in any combination of one or more programming languages, including an object oriented programming language such as Java, Smalltalk, C++ or the like and conventional procedural programming languages, such as the "C" programming language or similar programming languages. The program code may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider).

Aspects of the present invention are described above with reference to flowchart illustrations and/or block diagrams of methods, apparatus (systems) and computer program products according to embodiments of the present invention. It will be understood that each block of the flowchart illustrations and/or block diagrams, and combinations of blocks in the flowchart illustrations and/or block diagrams, can be implemented by computer program instructions. These computer program instructions may be provided to a processor of a general purpose computer, special purpose computer, or other programmable data processing apparatus to produce a machine, such that the instructions, which execute via the processor of the computer or other programmable data processing apparatus, create means for implementing the functions/acts specified in the flowchart and/or block diagram block or blocks.

These computer program instructions may also be stored in a computer readable medium that can direct a computer, other programmable data processing apparatus, or other devices to function in a particular manner, such that the instructions stored in the computer readable medium produce an article of manufacture including instructions which implement the function/act specified in the flowchart and/or block diagram block or blocks.

The computer program instructions may also be loaded onto a computer, other programmable data processing apparatus, or other devices to cause a series of operational steps to be performed on the computer, other programmable apparatus or other devices to produce a computer implemented process such that the instructions which execute on the computer or other programmable apparatus provide processes for implementing the functions/acts specified in the flowchart and/or block diagram block or blocks.

The flowchart and block diagrams in the Figures illustrate the architecture, functionality, and operation of possible implementations of systems, methods and computer program products according to various embodiments of the present invention. In this regard, each block in the flowchart or block diagrams may represent a module, segment, or portion of code, which comprises one or more executable instructions for implementing the specified logical function(s). It should also be noted that, in some alternative implementations, the functions noted in the block may occur out of the order noted in the figures. For example, two blocks shown in succession may, in fact, be executed substantially concurrently, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts, or combinations of special purpose hardware and computer instructions.

It will be understood from the foregoing description that modifications and changes may be made in various embodiments of the present invention without departing from its true spirit. The descriptions in this specification are for purposes of illustration only and are not to be construed in a limiting sense. The scope of the present invention is limited only by the language of the following claims.

What is claimed is:

1. A method of off-die termination of memory module signal lines in a computer memory subsystem, the computer memory subsystem comprising a memory controller and a Dual In-line Memory Module ('DIMM') socket installed on a printed circuit board ('PCB'), the memory controller electrically coupled to the DIMM socket via a memory module signal line, the method comprising:
   detecting, by a termination controller installed on the PCB, no presence of a DIMM in the DIMM socket; and
   responsive to the detection, activating, by the termination controller, an off-die termination component on the PCB to terminate the memory module signal line.

2. The method of claim 1 wherein the termination controller comprises a module of automated computing machinery configured as part of the memory controller.

3. The method of claim 1 wherein the termination controller comprises a module of automated computing machinery comprising a service processor.

4. The method of claim 1 wherein detecting no presence of a DIMM in the DIMM socket further comprises receiving a notification from the memory controller during startup that no DIMM is installed in the DIMM socket.

5. The method of claim 1 wherein:
   the off-die termination component comprises one or more Field Effect Transistors ('FETs') configured to couple the memory module signal to a ground reference voltage through a termination resistor component; and
   activating the off-die termination component further comprises enabling the one or more FETs to couple the memory module signal line to the ground reference voltage through the termination resistor component.

6. The method of claim 5 wherein:
   the termination resistor component further comprises a variable resistor; and
   the method further comprises setting the resistance of the variable resistor.

7. The method of claim 5 wherein:
   the termination resistor component further comprises a programmable resistor network; and
   the method further comprises setting the resistance of the programmable resistor network.

8. An apparatus for off-die termination of memory module signal lines in a computer memory subsystem, the computer memory subsystem comprising a memory controller and a Dual In-line Memory Module ('DIMM') socket installed on a printed circuit board ('PCB'), the memory controller electrically coupled to the DIMM socket via a memory module signal line, the apparatus comprising a computer processor and computer memory operatively coupled to the computer processor, the computer memory having disposed within it computer program instructions capable of:
   detecting, by a termination controller installed on a PCB, removal of a DIMM from the DIMM socket; and
   responsive to the detection, terminating the memory module signal line including activating an off-die termination component installed on the PCB.

9. The apparatus of claim 8 wherein the termination controller comprises a module of automated computing machinery configured as part of the memory controller.

10. The apparatus of claim 8 wherein the termination controller comprises a module of automated computing machinery comprising a service processor.

11. The apparatus of claim 8 wherein detecting removal of a DIMM from the DIMM socket further comprises receiving a notification from the memory control that no DIMM is installed in the DIMM socket.

12. The apparatus of claim 8 wherein:
   the off-die termination component comprises one or more Field Effect Transistors ('FETs') configured to couple the memory module signal to a ground reference voltage through a termination resistor component; and
   activating the off-die termination component further comprises enabling the one or more FETs to couple the memory module signal line to the ground reference voltage through the termination resistor component.

13. The apparatus of claim 12 wherein:
   the termination resistor component further comprises a variable resistor; and
   the apparatus further comprises computer program instructions capable of setting the resistance of the variable resistor.

14. The apparatus of claim 12 wherein:
   the termination resistor component further comprises a programmable resistor network; and
   the apparatus further comprises computer program instructions capable of setting the resistance of the programmable resistor network.

15. A computer program product for off-die termination of memory module signal lines in a computer memory subsystem, the computer memory subsystem comprising a memory controller and a Dual In-line Memory Module ('DIMM') socket installed on a printed circuit board ('PCB'), the memory controller electrically coupled to the DIMM socket via a memory module signal line, the computer program product disposed upon a computer readable storage medium, the computer program product comprising computer program instructions capable, when executed, of causing a computer to carry out the steps of:

detecting, by a termination controller installed on a PCB, removal of a DIMM from the DIMM socket; and responsive to the detection, terminating the memory module signal line including activating an off-die termination component installed on the PCB.

16. The computer program product of claim 15 wherein the termination controller comprises a module of automated computing machinery configured as part of the memory controller.

17. The computer program product of claim 15 wherein the termination controller comprises a module of automated computing machinery comprising a service processor.

18. The computer program product of claim 15 wherein detecting removal of a DIMM from the DIMM socket further comprises receiving a notification from the memory control that no DIMM is installed in the DIMM socket.

19. The computer program product of claim 15 wherein:

the off-die termination component comprises one or more Field Effect Transistors ('FETs') configured to couple the memory module signal to a ground reference voltage through a termination resistor component; and activating the off-die termination component further comprises enabling the one or more FETs to couple the memory module signal line to the ground reference voltage through the termination resistor component.

20. The computer program product of claim 19 wherein:

the termination resistor component further comprises a variable resistor; and the computer program product further comprises computer program instructions capable of setting the resistance of the variable resistor.

\* \* \* \* \*